F. R. MONROE.
MILK RETARDING APPARATUS.
APPLICATION FILED JUNE 11, 1912.

1,082,206.

Patented Dec. 23, 1913.

WITNESSES
C. J. Hachenberg
Wm. F. Nickel

INVENTOR
Fred R. Monroe
BY
ATTORNEYS

UNITED STATES PATENT OFFICE.

FRED ROY MONROE, OF MIDDLETOWN, NEW YORK, ASSIGNOR OF ONE-HALF TO JOHN D. HAGGERTY, OF SUSSEX, NEW JERSEY.

MILK-RETARDING APPARATUS.

1,082,206.  Specification of Letters Patent.  Patented Dec. 23, 1913.

Application filed June 11, 1912. Serial No. 703,097.

*To all whom it may concern:*

Be it known that I, FRED R. MONROE, a citizen of the United States, and a resident of Middletown, in the county of Orange and State of New York, have invented a new and Improved Milk-Retarding Apparatus, of which the following is a full, clear, and exact description.

My invention relates to milk retarding apparatus and comprises certain improvements in the construction and operation thereof by means of which the flow of the liquid through the retarder is also readily and easily controlled.

It comprises a plurality of tanks through which the heated milk is conducted, and in which it remains at the required temperature for the necessary length of time; and each of the tanks contains an improved device which receives the inflowing milk and divides the same into a number of streamlets so as to prevent the body of the milk contained in each tank from being agitated by the quantity of milk supplied to the inside of the tank to an undue extent.

Reference is to be had to the accompanying drawings forming a part of this specification, in which the same characters of reference indicate the same parts in all the views.

Figure 1:
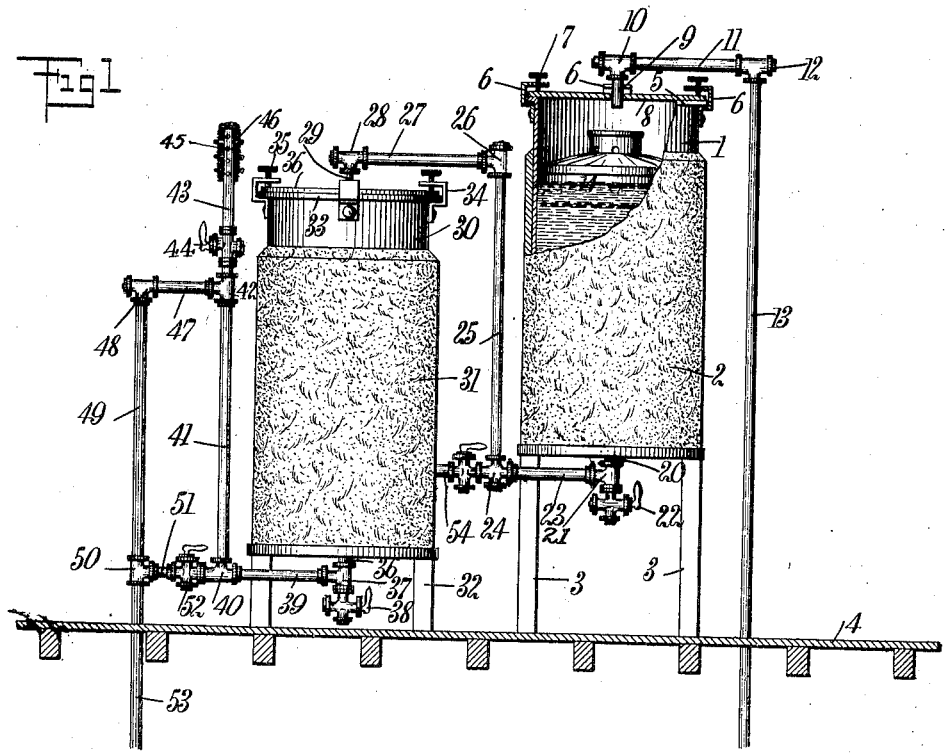
Figure 2:
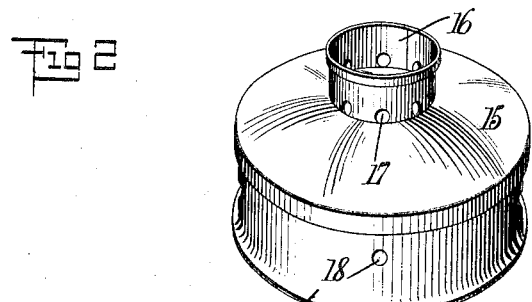

Figure 1 is a side elevation showing the arrangement of tanks for my improved milk retarding apparatus, one of the tanks being broken away to show the interior thereof; Fig. 2 is a perspective view showing an improved form of float which is placed in the tanks to divide the inflowing stream of milk into a number of fine streamlets to prevent the body of milk in each tank from being agitated; and Fig. 3 is a vertical section of the float.

On the drawings the numeral 1 represents the first tank of my apparatus, to which milk is supplied, and this tank is inclosed in a cover of asbestos or other fireproof and heat-proof material which lines the exterior surface thereof almost up to the top. The tank is supported upon standards 3 resting upon a floor 4; and the top of the tank is open and terminates in an outward-extending flange 5. This flange is surrounded by a number of brackets 6, each of which receives a tightening screw 7; and 8 is a cover for the top of the tank which rests upon the flange and is held in place by the tightening screws. This cover may have recesses in the rim to enable it to pass the screws and brackets when the same is laid on the top of the tank, and in such a case the cover will be turned to bring the uncovered portion of the circumference beneath the screws 7 when the screws are to be tightened. The recessed portions and the bracket 6 will be of such dimensions that when the cover is laid on the flange 5, the inner ends of the recessed portions will not lie within the inner edge of the flange 5, so that every opening from the outside to the inside of the tank 1 will be closed; and in practice I prefer to arrange a gasket or packing between the flange 5 and the cover 6, for the purpose of hermetically sealing the joint between the cover and the flange and make the tank perfectly air-tight on the interior.

Through the cover 8 passes the short length of pipe 9, connected with a T-coupling 10. This T-coupling is joined by means of a section of piping or tubing to a similar coupling 12, to which also leads a supply conduit 13. This conduit communicates with a pump which forces the milk after the same has been heated, into the tank 1.

Figure 3:
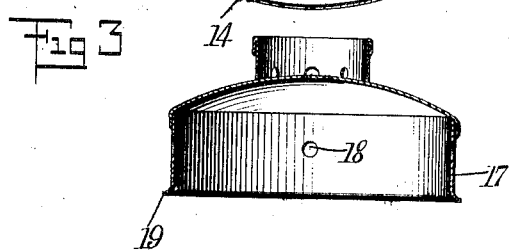

Inside of the tank 1 is a float 14, which has the form shown in Figs. 2 and 3. This float has a closed convex top 15, which supports a cylindrical projection 16 having apertures 17 therethrough in the bottom of the same; and 18 are similar apertures in the sides of the float 7, about half way between the top and bottom. The bottom is open as shown, and the edge is turned slightly outward. This tank is arranged to float on the surface of the milk with the top 15 in the position shown in Fig. 1, and the hollow cylindrical projection 16 coaxial with the inlet pipe 9. In consequence, milk flowing into the tank 1 will drop down upon the top 15 inside the projection 16 and flow outward through the apertures 17, over the edge of the top and between the sides of the float and the inside of the tank to the body of the milk which the tank contains. The apertures 17 will divide the milk thus entering, into a number of streamlets, each of which will discharge into the body of the liquid in the tank a quantity of milk too small to agitate the same. Ordinarily, the capacity of the apertures 17 will be sufficient to carry off the milk which flows into the projection 16, but should this projection ever fill, the milk will flow over the upper edge upon the convex top 15 and become diffused over the surface of its top. When this milk reaches the edge of the top and flows down along the sides of the float to the main body of the milk in the tank 1, it will enter the main body of the liquid at any given point in such a small quantity that no agitation or currents will result.

From the bottom of the tank 1 leads an outlet 20, which communicates with a T-coupling 21. The lower end of this T-coupling has an outlet valve 22 therein, and this coupling also unites with a section of piping 23, which leads to a four-way coupling 24. From this coupling a pipe 25 leads upward to a T-coupling 26, which communicates by means of a section of piping 27 to a T-coupling 28, similar to the T-coupling 10. From this last-named coupling leads a section of piping 29, which forms an inlet for a tank 30, similar in all respects to the tank 1, having an asbestos cover 31 and supported by standards 32. This tank has a flange 33 at the top and carries brackets 34 supporting binding screws 35, which fasten a cover 36 on the flange to close the open end of the tank. The bottom of the tank 30 has an outlet 36 communicating with a T-coupling 37.

38 is an outlet or drain cock below the T-coupling 37, and this T-coupling also communicates by means of a section of tubing 39 with a T-coupling 40.

41 indicates a pipe leading from the coupling 40 to a coupling 42, and 43 is an extension of the pipe 41, and contains a controlling valve 44. The upper end of the pipe 43 has a number of apertures 45 formed in its sides, and these apertures are covered by means of a gauze casing 46, the upper end of the pipe 43 being closed, as will be readily understood.

47 represents a pipe leading outward from the T-coupling 42 to a T-coupling 48, and 49 is a discharge pipe leading from this last-named coupling to a T-coupling 50.

51 represents a pipe passing from the pipe 41 to the pipe 49, and in this pipe is put the controlling valve 52. A discharge conduit 53 leads from the T-coupling 50 to conduct away the milk after the same has been treated in the tanks 1 and 30 to the required extent.

The numeral 54 represents a by-pass leading from the T-coupling 24 directly through the side of the tank 30, and this by-pass contains the controlling valve, as shown. By means of this by-pass milk can be conducted directly from the first tank into the second without being let up to pass into the top thereof through the inlet 29.

The manner of operation of my improved milk retarding apparatus is as follows: The tank 30 contains a float similar in all respects to the float 14, and milk passing into the tank 1 is divided by the action of the float 14, which prevents agitation of the volume of milk contained in this tank in the manner above described. From the tank 1 the milk flows through the pipes 23, 25, 27 and 29 into the tank 30, where it is divided in a similar manner by the float 14 in the tank 30, and it passes out of the tank 30 by way of the pipes 39, 41, 47, 49 and 53. The rate of flow through these tanks will be such as to cause the milk which is heated before being supplied to the tanks to remain therein at a certain temperature for the required time, and the coverings of asbestos or other heat-proof material on the outside of the tanks serve to prevent the milk from too rapid cooling. The milk can be taken out of the tank 1 through the valve 22 if desired, or, instead of being passed from the tank 1 to the tank 30 through the pipe 25 and inlet 29, it can be conducted directly into the tank 30 through the by-pass 54. In such a case the float 14 in the tank 30 will remain idle for the time being. After passing into the tank 30 the milk can be drawn out of the same either through the valve 38 or through the pipes 39, 41, 47 and 49, or directly through the by-pass 51 from the pipe 39 to the discharge conduit 53.

The function of the holes 18 in the float 14 is to permit the escape of air trapped below the convex top 15, when a volume of air thus trapped expands, owing to the increase in the temperature thereof. The air between the surface of the milk and the top of the float 14 will then pass out through the apertures 18, buoying up the float 14 only to the point of exposing the apertures 18. These apertures 18 are located a sufficient distance above the lower edge 19 to prevent the inclosed and heated air from expanding to a sufficient extent to upset or tilt the float 14 before the air escapes, a thing which often happens in floats of ordinary form, in which the apertures 18 are omitted. This tilting of the floats results in temporary displacement of the hollow cup-shaped projection 16, so that the incoming milk passing through the inlet 9 falls directly upon the convex top 15, with too much splashing and agitation in consequence. By means of my float provided with the apertures this splashing is avoided.

The reason for the practical utility of my improved form of float will, it is thought, become apparent from a little reflection. If the holes 18 were omitted the air would be forced to keep on expanding until the float was lifted so high with respect to the level of the surface of the milk in either tank as to be in a condition of stable equilibrium before any of the air could effect its escape.

In such condition the float might be made to tilt, with resultant splashing of the incoming stream of milk, by a number of very slight causes, such, for example, as a jar to the building in which the apparatus is set up, or an agitation of the contents, which might provide an outlet at one point below the edge of the float to permit some of the inclosed air to escape. The presence of the holes 18, however, prevents the expansion from proceeding so far as to disturb the equilibrium of the float before the holes 18 are uncovered and some of the air allowed to pass outside of the same. It will be noted that these holes are located some distance above the lower edge of the float, and when these holes are submerged a considerable portion of the mass of the float will be located below the surface of the liquid, and the air entrapped below the top will buoy up the float and prevent the milk from coming in contact with the inside of the top at all times. Furthermore, the expansion of this air will only lift the float high enough to expose one or more of the openings 18 and allow part of it to escape, after which the float will again settle down into the milk which carries it, and thus be kept in a substantially horizontal position, with the projection 16 in line with the inflowing stream of milk, to prevent splashing, as above described.

It will be observed that the pipe leading from the bottom of the tank 1 into the tank 30 and then from the bottom of the tank 30 up to the T-coupling 42, constitutes a siphon; and when all the air has been exhausted from the tanks 1 and 30 and pipes connecting the same, the flow of milk from the tank 1 to the tank 30 and therefrom through the pipes 41, 47 and 49 and out through the conduit 53, will continue, even though the level of the milk in each of the tanks should sink for the time being below the level of the T-coupling 42. This permits the tanks 1 and 30 to be completely exhausted of their contents by the milk passing out through the bottom of the first tank and then up and through the top of the second tank and up through the T-coupling 42 and down from the pipe 49 in the usual way. Should, however, it ever become desirable, the valve 44 can be turned, admitting air through the apertures 45 to the T-coupling 42, and thus interrupt the siphoning at that point. In that case the first tank can be drained through the by-pass 54 into the second tank, and the second tank drained through the pipe 39 and the by-pass 51 to the pipe 53. Or, if desired, the contents of either tank can be drained through the valves shown at 22 and 38.

It will be observed that the tank 1 is supported above the level of the tank 31, and that as long as the level of the milk in the tank 1 is above the level of the inlet to the tank 30, there will be a free flow from the first tank to the second through the pipes 23, 25 and 27, either by siphoning or by the head of the liquid in the tank 1. When the level of the milk in the tank 1 sinks below the top of the tank 30, the valve in the by-pass 54 can be opened to enable the milk in the tank 1 to flow directly into the tank 30; or the milk in the tank 1 can be drawn out by way of the valve 22, if desired.

So long as the level of the milk in the tank 30 is above the T-coupling 42, there will be a free flow from the tank 31 through the pipes 41, 47 and 49 in the same way. If the level of the milk sinks below this point the milk can still be siphoned off through the pipes 41, 47 and 49, but if it be desired to interrupt the siphoning by opening the valve 44, the milk can be drawn from the tank 31 through the by-pass 51 by opening the valve 52, or be drawn out directly by opening the valve 38.

By means of the above-described construction I have produced a milk retarding apparatus in which the connections are easily accessible for purposes of assembling, and washing and cleaning the tanks and the piping connecting the tanks, at all times. Furthermore, the action of the float is certain, and the liability of any temporary splashing and the resultant agitation of the milk in either tank, due to the tilting of the float, to such an extent as to permit the incoming milk passing through the top of either tank to fall directly upon the convex top 15, is almost entirely eliminated.

Obviously, while I have shown two tanks, the scope of my invention is not limited to that number, but I may use a larger number if desired. Whatever number may be used, however, the tanks will be connected in the same manner as the tanks 2 and 31, in descending order, the siphon attachment being applied to the lowest in the series.

I wish to have it understood that the above description and the drawings illustrating the same present but one embodiment of my invention, and that I do not wish to be limited to the details thereof but wish to reserve to myself the right to make whatever changes in the shape, size and arrangement of the parts fairly fall within the scope of the appended claims.

Having thus described my invention, I claim as new and desire to secure by Letters Patent:

1. In an improvement of the kind described, a float comprising a cylindrical body having an open lower end and having a convex top closing the upper end, said convex top having a hollow cylindrical projection provided with apertures therethrough around its lower edge, and the sides of said float having apertures therethrough below the level of the top to permit the escape of air from the interior of the float when the same is in use.

2. In a device of the kind described, a float comprising a hollow cylindrical body having an open lower end, the edge of which is turned outward, and having its upper end closed by a convex top, said top having a hollow cylindrical projection provided with apertures therethrough adjacent said top, the sides of said body also being provided with apertures to permit the escape of air from the interior of said float.

3. A float comprising a hollow body having an open bottom and a closed top, said float having one or more apertures in its side below the level of the top, to permit the escape of air from the interior of the float when the same is in use.

4. A float comprising a hollow body having an open bottom and a closed top, said float having one or more apertures passing through its side below the level of the top, to permit the escape of air from the interior of the float, and having a hollow open projection extending upward from the top.

5. A float comprising a hollow body having an open bottom and a closed top, and having one or more apertures in its side below the level of the top, to permit the escape of air from the interior of the float, and a hollow, open projection carried by said top, said projection having one or more apertures through its sides.

6. A siphon comprising an extension to permit air to enter the same between the arms thereof, said extension having apertures through its upper end and having foraminous material covering said apertures, and a controlling valve in said extension between the siphon and said apertured end.

7. A float comprising a cylindrical body having an open bottom and a convex top, said float having one or more apertures through its sides below the level of the top, to permit the escape of air from the interior thereof.

8. A float comprising a cylindrical body having an open bottom and a convex top, said float having one or more apertures through its sides below the level of the top, to permit the escape of air from the interior thereof, and having a hollow, cylindrical projection open at its upper end extending upward from the top thereof.

9. A float comprising a cylindrical body having an open bottom and a convex top, said float having one or more apertures through its sides below the level of the top, to permit the escape of air from the interior thereof, and having a hollow, cylindrical projection open at its upper end extending upward from the top thereof, said projection having one or more apertures therethrough adjacent the convex top.

10. In a device of the kind described, the combination of a plurality of tanks, means for delivering liquid into the first tank centrally through the top thereof, means for delivering the contents of the first tank to the next tank centrally through the top of the next tank, and means inclosed by each of said tanks adapted to float upon the liquid contents thereof, said last-named means having means forming a cavity or recess in its top to retain part of the incoming liquid and form a pool to prevent splashing.

In testimony whereof I have signed my name to this specification in the presence of two subscribing witnesses.

FRED ROY MONROE.

Witnesses:
 FLORENCE E. HARE,
 A. C. N. THOMPSON.